UNITED STATES PATENT OFFICE.

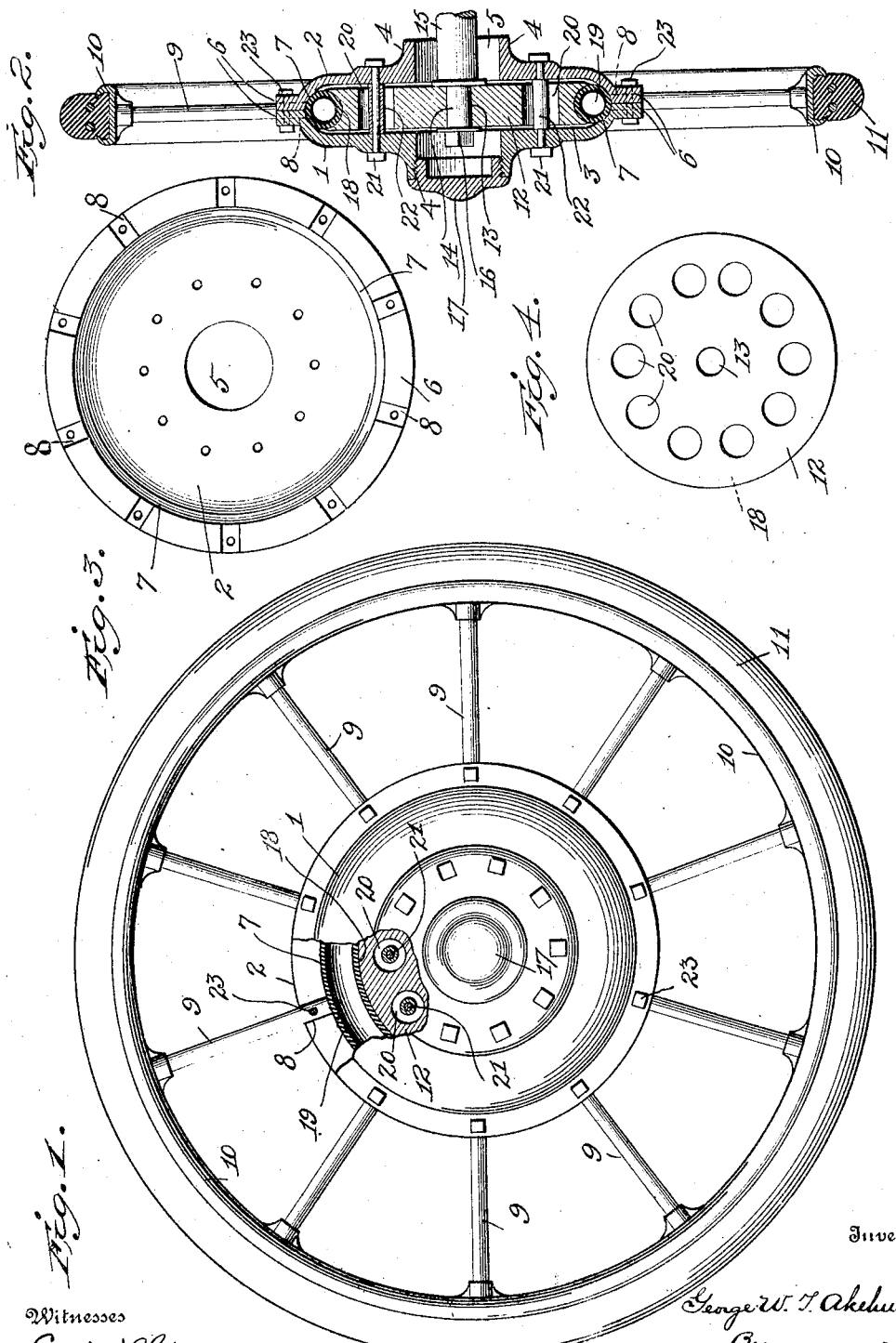

GEORGE W. T. AKEHURST, OF WHITE MARSH, MARYLAND.

VEHICLE-WHEEL.

No. 827,494.   Specification of Letters Patent.   Patented July 31, 1906.

Application filed November 16, 1905. Serial No. 287,637.

*To all whom it may concern:*

Be it known that I, GEORGE W. T. AKEHURST, a citizen of the United States, residing at White Marsh, in the county of Baltimore and State of Maryland, have invented certain new and useful Improvements in Vehicle-Wheels, of which the following is a specification.

My invention relates to improvements in wheels for vehicles, and has particular reference to that class of wheels in which a cushion or yielding support is provided in the wheel structure at the hub.

The object of the invention is to construct a wheel which will have all the advantages of wheels whose rims are provided with pneumatic tires, but without the liability of such wheels to wear and puncture.

The invention consists in the improved construction, combination, and arrangement of the parts, as will be hereinafter described and claimed.

The accompanying drawings illustrate the invention, in which—

Figure 1 shows a side elevation of a wheel constructed in accordance with my invention. Fig. 2 illustrates a central cross-section through the wheel. Fig. 3 shows an inner face view or side elevation of one of the halves of the metal head. Fig. 4 illustrates a side elevation of the central spindle-supporting block.

Referring to the drawings by numerals, 1 and 2 designate two halves of a hollow metal head which when placed together form a central circular chamber 3. At the center these heads are provided with a laterally-projecting flange 4, which form an opening 5, through which the spindle of an axle is to project. On the interior of the head and near the abutting circular flanges 6 thereof is an annular channel 7, and on the exterior the periphery of the head is provided with a plurality of spoke-sockets 8. The inner ends of the spokes 9 fit into the sockets 8 on the head, while the outer ends of said spokes enter a rim 10, which may be provided with an ordinary cushion or rubber tire 11. The construction of the rim and the manner of securing the outer ends of the spokes are immaterial and may be varied to suit the purpose and the particular vehicle on which the wheel is to be used.

A circular block or hub 12 has position on the interior of the head and is movable in the circular chamber 3. This block or hub is provided with a central perforation 13, through which the spindle 14 of the axle 15 projects and has bearing. The outer end of the spindle is provided with a nut 16, which has position within the circular flange 4 at the outer side of the head. A cap 17 screws into the outer circular flange of the head and covers the end of the spindle.

The block or hub 12 is provided with an annular groove or channel 18 around its periphery which confronts the annular channel 7 on the interior of the head, and a pneumatic tube or ring 19 has position in said channels and extends around the block or hub 12.

It will thus be seen that the spindle has bearing in the block or hub 12 and that the latter is inclosed by the head and rests on the pneumatic tube or ring 19. In order to provide for the vertically-yielding movement of the hub within the head, I provide the hub with a plurality of circular openings 20, which are arranged radially with respect to the central perforation 13, and through these openings the bolts 21, securing the two halves of the head, extend. As the cross-sectional size of each of these bolts is much smaller than the hub-openings 20, it will be seen the hub may move. In order to permit the two halves of the head to be drawn tightly together without binding on the sides of the block or hub, I place a sleeve or tube 22 around each bolt and make these sleeves of a length slightly longer than the width of the block or hub, so they will project at each side of the hub and contact with the inner surface of the two members forming the head. By this arrangement the head members may be securely bolted together without binding against the side of the hub, and thus the hub may move freely in the circular chamber 3, so as to bring the weight of the vehicle on the pneumatic tube 19.

The spoke-sockets 8 are formed in halves like the head and when together form the complete socket. The inner ends of the spokes are inserted in the sockets, and a bolt 23 is passed through each socket and also through the spoke and serves to hold the spoke in place and at the same time secure the head members together.

Having thus described my invention, what I claim as new, and desire to secure by Letters Patent, is—

The herein-described vehicle-wheel having two circular plates with circumferential abutting flanges, 6, on the rim edge of which are sockets for the ends of spokes, said plates at their central part being spaced from each other and forming a chamber of uniform width; a hub in said chamber of uniform width and having a circumferential channel; a pneumatic ring-tube seated in the said hub-channel and bearing against the two circular plates directly inside of the spoke-sockets, and bolts connecting the two plates at points within the circumferential channel of the said hub.

In testimony whereof I affix my signature in presence of two witnesses.

GEORGE W. T. AKEHURST.

Witnesses:
CHARLES B. MANN,
FELIX R. SULLIVAN